(No Model.)　　　　　　H. F. MILLER.　　　　2 Sheets—Sheet 1.
EVAPORATING PAN.

No. 518,962.　　　　　　　　　　　　Patented May 1, 1894.

Attest
Wm. T. Hall
May E. Moore

Inventor
Henry F. Miller
by Wm Moore
Atty

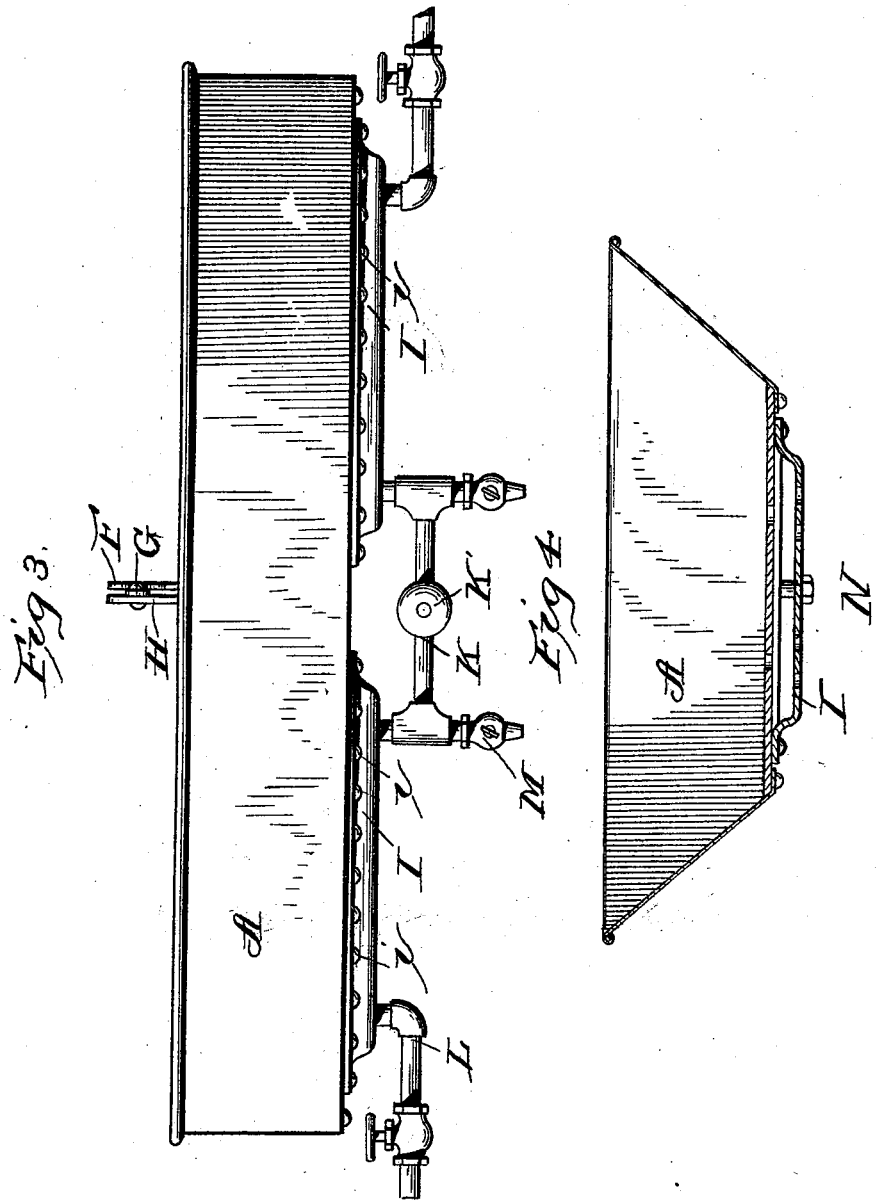

UNITED STATES PATENT OFFICE.

HENRY F. MILLER, OF LIMA, OHIO.

EVAPORATING-PAN.

SPECIFICATION forming part of Letters Patent No. 518,962, dated May 1, 1894.

Application filed May 16, 1893. Serial No. 474,398. (No model.)

*To all whom it may concern:*

Be it known that I, HENRY F. MILLER, a citizen of the United States, residing at Lima, in the county of Allen and State of Ohio, have invented certain new and useful Improvements in Evaporating-Pans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in evaporating pans for evaporating sorghum, maple sugar, apple jelly, and the like, and the object of the invention is to provide an improved form of pan or pans in which the above stated materials may be easily and quickly evaporated without any danger of burning.

The invention consists primarily of a stationary pan for holding the material to be evaporated, the said pan having a steam space beneath the bottom with steam pipes connected therewith for supplying steam to heat the pan.

The invention also consists in a pan having one or more division walls forming a series of compartments with gateways connecting said compartments, and steam spaces located beneath the compartments with steam pipes connecting therewith.

The invention is illustrated in the accompanying drawings, in which—

Figure 1:
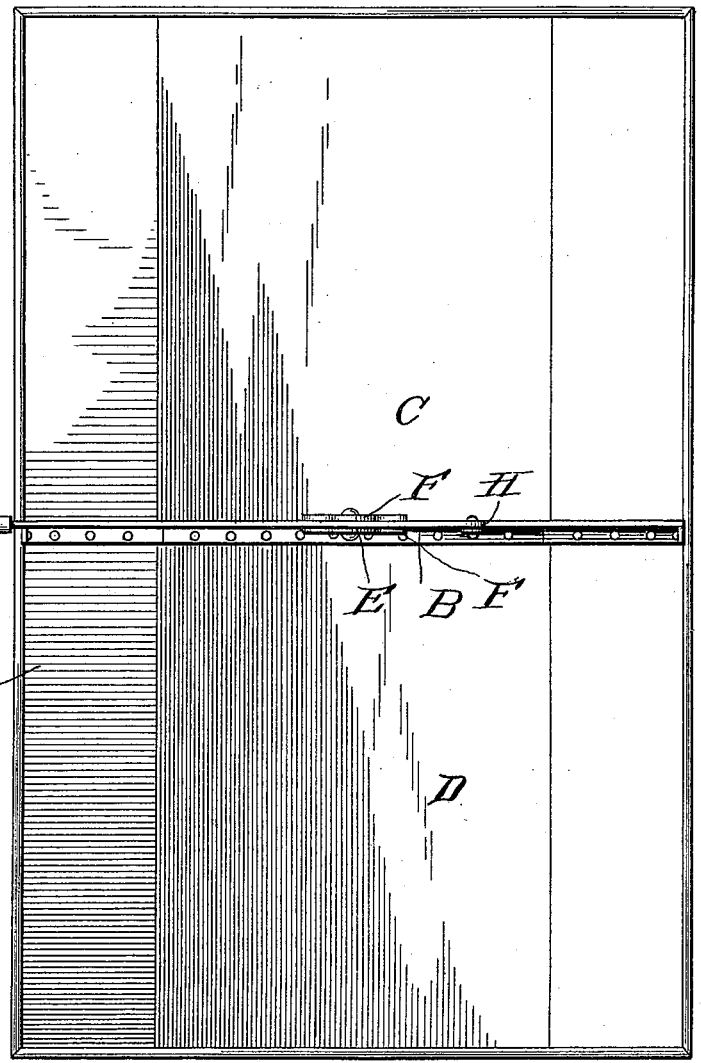
Figure 2:
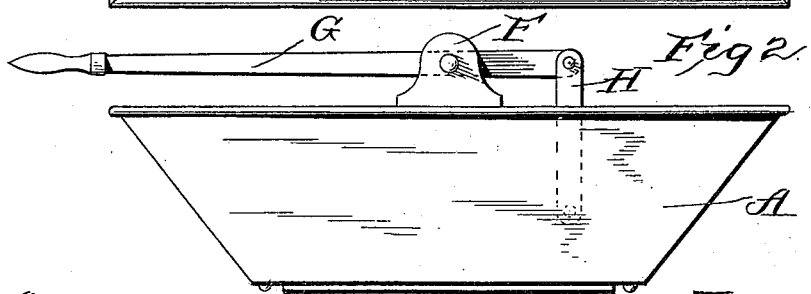

Figure 1 is a plan view of an embodiment of the invention. Fig. 2 is an end elevation of the same. Fig. 3 is a side view, and Fig. 4 is a vertical transverse sectional view of the evaporating pan.

The pans are constructed of sheet metal, and supported in any suitable manner by standards of ordinary form [not shown] and consist essentially of a rectangular vessel A, which is divided into two or more compartments in the present instance by a division wall B, the compartments being lettered respectively C, and D. An opening E, in the division wall affords communication between the two compartments and this opening is adapted to be closed by a sliding door or gate F, operated by a hand lever G, pivotally connected to the division wall by a link H, as shown. Beneath each compartment is located a supplemental bottom I, which is dished or concaved, and is secured by having its edges riveted to the bottom of the pans by suitable rivets $i$. This supplemental bottom thus forms a steam space to which steam may be supplied to heat the pans or compartments above.

I have shown in the present drawings a separate steam space located beneath each compartment, but it will be understood that one space might extend the whole length of the series if desired. I find it more desirable however, to provide a separate steam space beneath each compartment, and to connect them by a steam pipe K, provided with a suitable stop cock or valve $k'$, so that steam may thus be communicated from one to the other, or by turning the cock they may be thus changed into independent steam spaces. An inlet pipe L, is provided for each steam space, and also an outlet pipe for the same, as at M.

I find it desirable to strengthen the supplemental bottom to sustain it against the pressure of the steam by means of stay bolts N, which connect the two bottoms and brace them effectually against any excess of steam pressure.

Suitable cocks O, are provided for drawing off any condensed water from the steam spaces.

Having thus described my invention, what I claim is—

An evaporating pan having a division wall forming a series of compartments, a sliding gate in the wall controlling communication between said compartments, a lever fulcrumed to the pan for operating the gate, a supplemental bottom secured beneath each compartment and forming a steam space, steam pipes connecting with the steam spaces, a pipe connecting adjoining compartments provided with a cut-off valve, and drip pipes connected with each steam space for drawing off the water of condensation, substantially as described.

In testimony whereof I affix my signature in presence of two witnesses.

HENRY F. MILLER.

Witnesses:
J. L. PRICE,
EMERSON W. PRICE.